Nov. 15, 1938.  S. R. LARGE  2,136,819

ANTIFRICTION BEARING

Filed April 29, 1936

INVENTOR:
SAMUEL R. LARGE,
BY Gales P. Moore
HIS ATTORNEY.

Patented Nov. 15, 1938

2,136,819

UNITED STATES PATENT OFFICE 2,136,819

ANTIFRICTION BEARING

Samuel R. Large, Bristol, Conn., assignor to General Motors Corporation, Detroit, Mich., a corporation of Delaware Application April 29, 1936, Serial No. 77,000

10 Claims. (Cl. 308—236)

This invention relates to antifriction bearings and comprises all of the features of novelty herein disclosed. An object of the invention is to provide improved means for securing a bearing race ring on a supporting member. Another object is to provide a simple and inexpensive race ring securing means which is carried by and handled as a unit with the race ring. Another object is to provide an efficient adapter which will enable a race ring to be firmly secured to a shaft or the like without distortion of the raceway surface.

To these ends and also to improve generally upon devices of this character the invention consists in the various matters hereinafter described and claimed. In its broader aspects the invention is not necessarily limited to the specific construction selected for illustrative purposes in the accompanying drawing in which—

Figure 1:
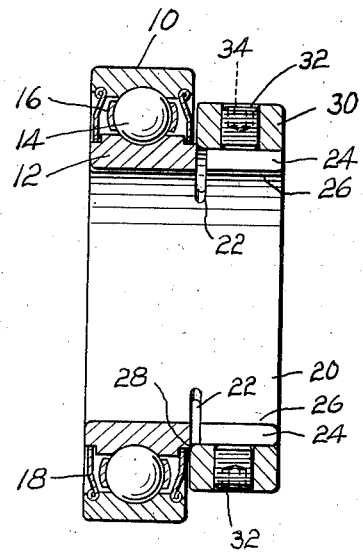
Fig. 1 is an axial sectional view of a bearing having the improved adapter or securing means.
Figure 2:
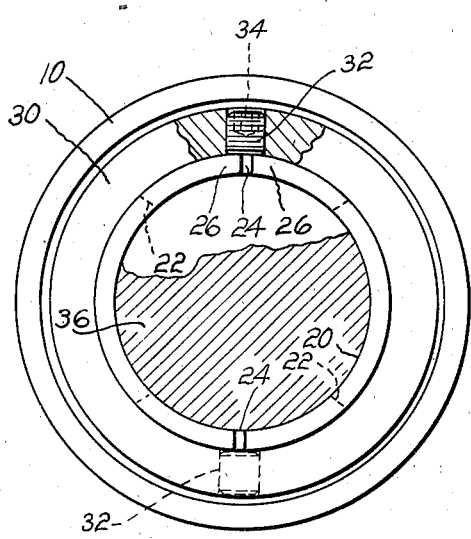
Fig. 2 is a side elevation with a portion of the shaft and a portion of the collar in section.

The numeral 10 indicates an outer race ring of an antifriction bearing having an inner race ring 12 and rolling elements 14. The rolling elements are herein shown as balls spaced apart by a separator 16 and the ends of the bearing are closed by suitable shields 18. The foregoing is only illustrative of a suitable bearing to which the invention may be applied. The inner race ring is shown as provided with an extension 20 at one end. Portions of the extension 20 are rendered radially displaceable by arcuate recesses or slots 22 which separate the extension from the body of the ring for a considerable angular distance. These slots are preferably parallel to the ends of the ring at an intermediate portion and they are intersected at the middle by axial slots 24 thereby making mating pairs of overhanging fingers 26 which are yieldable with respect to the body of the race ring. There may be more or less than two pairs of fingers but preferably there are two pairs which are on opposite sides of the extension. The arcuate slots 22 and the intersecting axial or longitudinal slots 24 extend throughout the radial thickness of the overhanging portion of the ring.

The extension is preferably of smaller external diameter than the body of the race ring 12 to form an annular shoulder or abutment 28 for a ring or collar 30 sleeved on the extension and free from the shaft. The collar has threaded radial openings for set screws 32, each adapted to straddle a slot 24 to bear on the ends of the adjacent fingers 26. Each set screw has a socket 34 to receive a wrench so that, upon screwing in the set screw, the fingers 26 are displaced inwardly to tightly grip a shaft 36 on which the inner race ring 12 is supported.

I claim:

1. In a unit-handling antifriction bearing and securing means, a race ring adapted for connection to a supporting member, the race ring having a displaceable end portion separated axially from the body of the ring by an arcuate slot extending angularly of the ring and through its radial thickness at a location between its ends, and means engaging the displaceable portion for forcing it against the supporting member; substantially as described.

2. In a unit-handling antifriction bearing and securing means, a race ring adapted for connection to a supporting member, the race ring having displaceable end portions separated from the body of the ring by an axial slot intersecting an arcuate slot, each slot extending through the radial thickness of the race ring, a collar surrounding the displaceable end portions, and means reacting between the collar and the displaceable portions to force the latter against the supporting member; substantially as described.

3. In a unit-handling antifriction bearing and securing means, a race ring adapted for connection to a supporting member, the race ring having displaceable fingers extending angularly of the ring in opposite directions and formed by an axial slot intersecting an angularly extending slot, the angularly extending slot cutting radially through the ring substantially parallel to one of the end faces thereof, a collar surrounding the slotted portions of the ring, and means reacting between the collar and the ends of the fingers for forcing the latter against the supporting member; substantially as described.

4. In a unit-handling antifriction bearing and securing means, a race ring adapted for connection to a supporting member, the race ring having an extension with an arcuate portion separated axially from the body of the ring by an arcuate slot through the radial thickness of the ring, to be displaceable by radial forces, a collar surrounding the extension, and a set screw carried by the collar and adapted to engage the displaceable portion to force it against the supporting member; substantially as described.

5. In a unit-handling antifriction bearing and securing means, a race ring adapted for connection to a supporting member, the race ring having a displaceable portion separated axially from the body of the ring by an angularly extending recess, the body of the ring having a shoulder, a collar surrounding the displaceable portion and abutting against the shoulder, and a set screw engaging the collar and the displaceable portion; substantially as described.

6. In a unit-handling antifriction bearing and securing means, a race ring having an end extension adapted for gripping engagement with a supporting member, said extension having a displaceable portion separated axially from the body of the ring by an angularly extending slot through the radial thickness of the ring and substantially parallel to one end, and means movable with respect to the extension for forcing the displaceable portion against the suporting member; substantially as described.

7. In a unit-handling antifriction bearing and securing means, a race ring adapted for connection to a supporting member, the race ring having an extension projecting laterally therefrom, the extension having an arcuate portion rendered displaceable by an arcuate slot through the radial thickness of the ring, a collar sleeved on said extension, and a device for securing the collar on the extension and for forcing the arcuate portion of the extension against the supporting member; substantially as described.

8. In an antifriction bearing, a race ring adapted for connection to a supporting shaft, the race ring carrying at one end an axial extension, one portion of the extension being an integral projection of the race ring and another portion being relatively movable and broken to contract against the shaft, the integral projection supporting the contractible portion, a collar having one portion embracing the integral projection and another portion embracing the contractible portion, and interengaging means between the collar and the contractible portion for causing the latter to contract and grip the shaft without distorting the load carrying portion of the race ring; substantially as described.

9. In a device of the character described, a ring having an arcuate slot extending through the radial thickness thereof, the ring also having a slot through its radial thickness and extending from one end to intersect the arcuate slot, a collar surrounding the end portion of the ring, and means reacting between the collar and the end portion of the ring to contract said end portion against a supporting member; substantially as described.

10. In a device of the character described, a ring having an arcuate slot extending through the radial thickness thereof at an intermediate portion of the length of the ring to provide a deflectable end which is partially broken away and spaced axially from the body of the ring, a collar surrounding the deflectable end, and means carried by the collar for radially contracting the deflectable end of the ring; substantially as described.

SAMUEL R. LARGE.